United States Patent Office 3,143,899
Patented Aug. 11, 1964

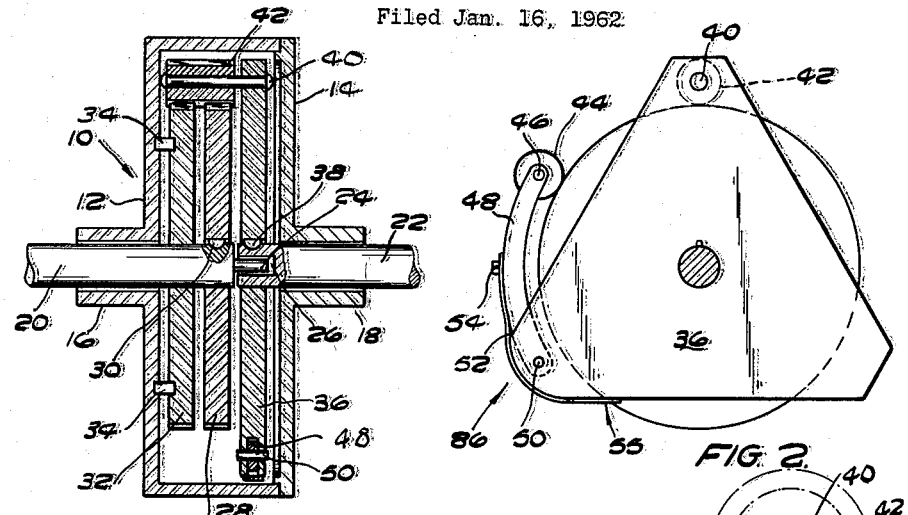
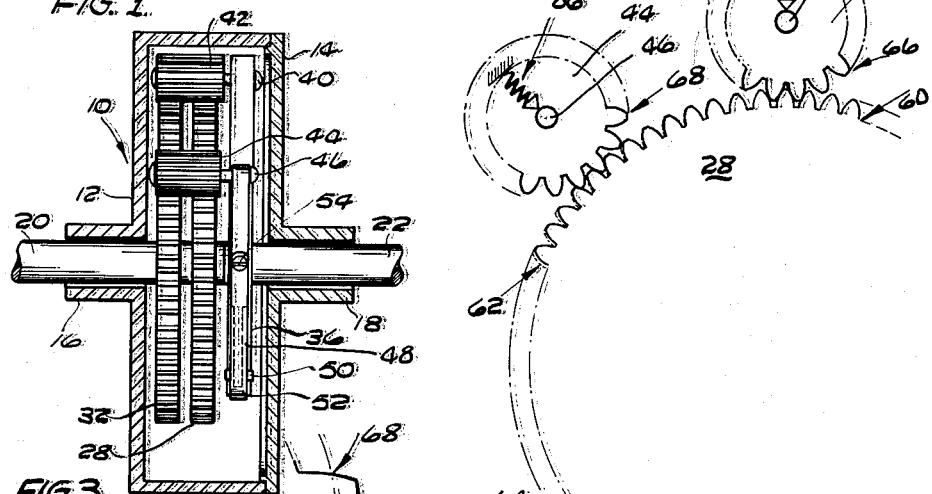
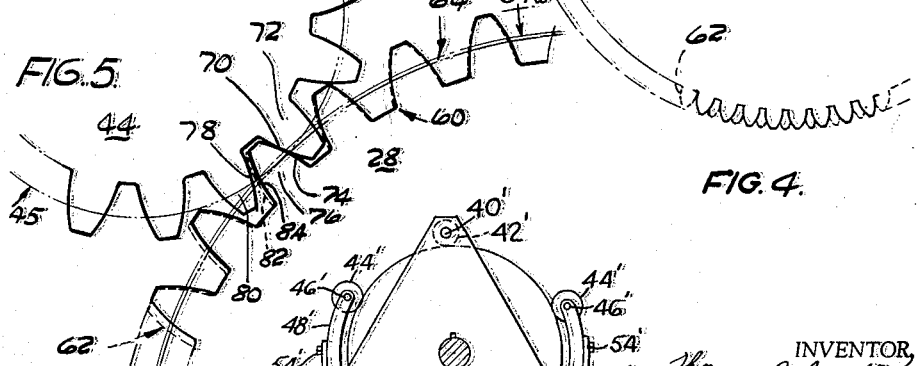
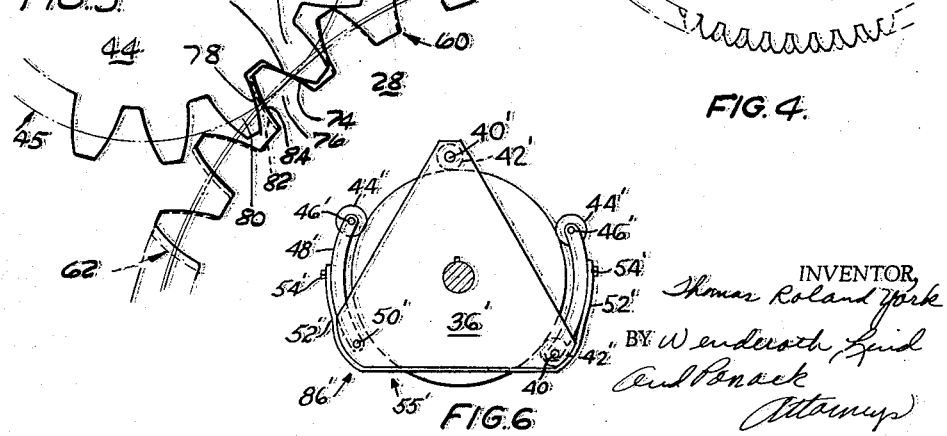

3,143,899
SPEED REDUCER UNIT OR DRIVE
Thomas Roland York, Kloofzicht, Pretoria, Transvaal, Republic of South Africa, assignor to South African Council for Scientific and Industrial Research, Scientia, Pretoria, Transvaal, Republic of South Africa
Filed Jan. 16, 1962, Ser. No. 166,561
4 Claims. (Cl. 74—781)

This invention relates to a speed reducer unit or drive, particularly for an instrument, where it is advantageous to have speed reduction with little or no backlash between forward and reverse drive.

According to the invention a speed reducer unit includes a first gear wheel mounted to rotate about an axis; a second gear wheel coaxial with the first gear wheel and having a pitch circle diameter slightly different from that of the first gear wheel and having teeth differing in number from that of the first gear wheel; anchoring means to anchor the second gear wheel; a carrier coaxial with both gear wheels and mounted to rotate about its axis; and at least one set of toothed planet wheels and comprising a first planet wheel connected to the carrier and having its teeth simultaneously in mesh with the teeth of the first and second gear wheels and mounted to rotate about an axis parallel to the carrier axis, and a second planet wheel connected to the carrier and circumferentially spaced from the first, and bias mounting means urging the second planet wheel and its teeth resiliently into simultaneous engagement with the teeth of both gear wheels.

The gear wheels may be externally toothed; and the bias mounting means may comprise an arm mounted on the carrier to pivot about an axis parallel to the carrier axis, and spring means coacting between the arm and the carrier and urging the arm about its pivotal axis towards the carrier rotational axis. There may be provided a casing around the gear wheels and carrier, the anchoring means anchoring the second gear wheel to the casing; an output shaft fast with the first gear wheel and coaxial with it and mounted to rotate in a bearing provided in the casing and projecting out of the casing; and an input shaft fast with the carrier and coaxial with it and mounted to rotate in a bearing provided in the casing and projecting from the casing oppositely to the output shaft.

The first and second gear wheels may have their teeth internally, the carrier being disposed axially between them; and there may be provided a hollow shaft fast with the first gear wheel, and a shaft coaxial with the hollow shaft and passing through it, the bias mounting means being arranged to urge the second planet wheel outwardly away from the carrier axis. There may similarly be provided a casing around the gear wheels and carrier, the anchoring means anchoring the gear wheel to the casing; and a bearing in the casing and coaxial with the gear wheels and supporting the hollow shaft rotatably.

There may be provided a plurality of sets of first and second planet wheels but not more in number than the difference in the number of teeth between the first and second gear wheels, the planet wheel sets being disposed circumferentially around the periphery of the gear wheel at regions where the teeth of the two gear wheels are in line.

Further features of the invention will become apparent from the following description of specific embodiments with reference to the accompanying diagrams.

In the drawings:
FIGURE 1 shows diagrammatically a sectional side elevation of one embodiment of the invention;
FIGURE 2 shows diagrammatically an end elevation of carrier and gear wheels;
FIGURE 3 shows diagrammatically a side elevation but sectioned through the casing;
FIGURE 4 shows diagrammatically in end elevation the meshing arrangements between the planet wheels and gear wheels;
FIGURE 5 shows diagrammatically in end elevation the meshing arrangements between the biased planet wheel and gear wheels; and
FIGURE 6 shows diagrammatically an end elevation of a carrier with a plurality of gear wheels and a plurality of planet wheels.

Referring to the drawings, reference numeral 10 refers generally to a speed reducer unit in accordance with the invention and comprising a casing 12 having a coacting end shield 14 rotatably supporting in coaxial arrangement, output shaft 20 and input shaft 22, in bosses 16 and 18. Output shaft 20 has a stub end 24 rotatably supported in socket 26 in the end of input shaft 22. First gear wheel 28 has straight spur teeth and is coaxial with output shaft 20 and keyed to it by means of key 30. Second gear wheel 32 also has straight spur teeth and is coaxial with the first gear wheel 28, and has a pitch circle diameter equal to that of the first gear wheel 28, but has one tooth more than first gear wheel 28. Second gear wheel 32 is anchored by means of anchoring means, comprising pins 34, to casing 12. Coaxial with input shaft 22, there is provided a carrier 36 keyed to the input shaft by means of key 38, and carrying pin 40 about whose axis there is mounted rotatably a first toothed planet wheel 42 having its teeth in mesh with the teeth of both the first gear wheel 28 and the second gear wheel 32. The axis of pin 40 is parallel to those of the first and second gear wheels.

Referring now in particularly to FIGURE 2, there is shown diagrammatically a second toothed planet wheel 44, mounted to rotate about the axis of pin 46 carried by an arm 48, mounted to pivot about the axis of a further pin 50, carried by the carrier 36. The axes of pins 46 and 50 are parallel to the first and second gear wheel axes. The arm 48 is urged resiliently towards the axis of the first and second gear wheels, by bias mounting means generally indicated by reference numeral 86 and comprising a leaf spring 52 secured to arm 48 by a screw 54, the leaf spring abutting against the carrier 36, along the region 55.

Referring now to FIGURES 4 and 5, it will be noted that the teeth 60 of the first gear wheel are shown in full line whereas the teeth 62 of the second gear wheel are shown in broken lines. It will be noted further that the first and second gear wheels have slightly different pitch circle diameters 64 and 64a. The teeth 66 of planet wheel 42 mesh simultaneously with the teeth 60 and 62 of the first and second gear wheels in a region where they are in line, as shown in FIGURE 4. The teeth 68 of planet wheel 44 have pitch circle diameter 45 and mesh simultaneously with the teeth of the first and second gear wheels, along a region where the teeth of the first and second gear wheels are slightly out of line. In such circumstances, the one flank 70 of tooth 72 of planet wheel 44 engages with a mating flank 74 of mating tooth 76 of first gear wheel 28. The opposing flank 78 of adjacent tooth 80 of planet wheel 44, engages with mating flank 82 of a tooth of second gear wheel 32. Referring to FIGURE 5, it will be noted that flank 82 leads slightly flank 84 of tooth 76.

It will be realised that the circumferential spacing between the planet wheels of a set will depend to some extent upon the difference in number of teeth between the two gear wheels and also upon mechanical clearances available. Where there is a single tooth difference only, then the spacing between planet wheels can conveniently be of the order of about 60°. Where the number of teeth difference is greater, say two, or three, or more, then two, or three, or more sets of planet wheels may be provided if desired, and spaced equally if desired around the periphery of the gear wheels. The spacing between planet wheels of a set will be correspondingly reduced.

In operation, the teeth 68 of planet wheel 44 are urged resiliently into mating contact with the teeth 60 and 62 of the first and second gear wheels, by means of the bias mounting means 86. Inasmuch as the teeth 68 engage simultaneously with the teeth 60 and 62, there is no backlash between the input and the output shafts, when the direction of rotation of the input shaft is reversed.

A reduction drive in accordance with the invention, can therefore be provided to have a large velocity ratio, and little or no backlash. This feature of having no backlash is an advantage in instruments.

FIGURE 6 shows a construction similar to FIGURE 2 wherein a plurality of gear wheels and planet wheels are disclosed. In this figure the elements have the same reference characters as in FIGURE 2 but are primed.

I claim:

1. A speed reducer unit which includes a first gear wheel mounted to rotate about an axis; a second gear wheel coaxial with said first gear wheel and having a pitch circle diameter slightly different from that of said first gear wheel and having teeth differing in number from that of said first gear wheel; anchoring means to anchor said second gear wheel; a carrier coaxial with both said gear wheels and mounted to rotate about its axis; and at least one set of toothed planet wheels comprising a first planet wheel connected to said carrier having its teeth simultaneously in mesh with the teeth of said first and second gear wheels and mounted to rotate about an axis parallel with the carrier axis, and a second planet wheel connected to said carrier circumferentially spaced from said first planet wheel, and bias mounting means urging the second planet wheel and its teeth resiliently into simultaneous engagement with the teeth of both said gear wheels.

2. A speed reducer unit according to claim 1 in which said gear wheels are externally toothed; and said bias mounting means comprises an arm mounted on said carrier pivoting about an axis parallel to the carrier axis, and spring means coacting between said arm and said carrier urging said arm about its pivotal axis towards the carrier rotational axis.

3. A speed reducer unit, according to claim 2, in which there is provided a casing around said gear wheels and carrier, said anchoring means anchoring said second gear wheel to said casing; an output shaft fixed to said first gear wheel and coaxial with it, a bearing provided in said casing in which said output shaft rotates and projects out of said casing; an input shaft fixed to said carrier and coaxial with it, and a second bearing provided in said casing in which said input shaft rotates and projects from said casing oppositely to said output shaft.

4. A speed reducer unit, according to claim 1, in which there are provided a plurality of sets of first and second planet wheels but not more in number than the difference in the number of teeth between said first and second gear wheels, said planet wheel sets being disposed circumferentially around the periphery of said gear wheels at regions where the teeth of said two gear wheels are in line for the first planet wheel of each set, and just out of line for the second planet wheel of the same set of planet wheels.

References Cited in the file of this patent
UNITED STATES PATENTS

| | | |
|---|---|---|
| 2,329,604 | Ginter | Sept. 14, 1943 |
| 2,780,200 | Winters | Feb. 5, 1957 |
| 2,830,473 | Brown | Apr. 15, 1958 |

OTHER REFERENCES

Gutmann, F. T.: 18 Ways to Control Backlash in Gearing, in Product Engineering, vol. 30, page 71, Oct. 26, 1959.